(12) United States Patent
Wagner et al.

(10) Patent No.: US 8,430,636 B2
(45) Date of Patent: Apr. 30, 2013

(54) WIND TURBINE ROTOR ASSEMBLY

(76) Inventors: Thomas V. Wagner, Moorpark, CA (US); Joseph W. Wagner, Woodland Hills, CA (US)

( * ) Notice: Subject to any disclaimer, the term of this patent is extended or adjusted under 35 U.S.C. 154(b) by 1132 days.

(21) Appl. No.: 12/315,568

(22) Filed: Dec. 3, 2008

(65) Prior Publication Data

US 2009/0148304 A1    Jun. 11, 2009

Related U.S. Application Data

(60) Provisional application No. 61/005,595, filed on Dec. 5, 2007.

(51) Int. Cl.
| | |
|---|---|
| *B63H 1/06* | (2006.01) |
| *B63H 5/125* | (2006.01) |
| *B64C 11/12* | (2006.01) |
| *B64C 11/28* | (2006.01) |
| *B64C 27/50* | (2006.01) |
| *F01D 5/00* | (2006.01) |

(52) U.S. Cl.
USPC ............... 416/132 B; 416/240; 416/132 A; 416/196 A; 416/131; 416/132 R

(58) Field of Classification Search ............... 416/240, 416/132 A, 132 B, 196 A, 202, 131, 132 R, 416/DIG. 3
See application file for complete search history.

(56) References Cited

U.S. PATENT DOCUMENTS

| | | |
|---|---|---|
| 4,291,235 A | 9/1981 | Bergey, Jr. et al. |
| 6,106,232 A | 8/2000 | Wagner |
| 6,893,223 B2 | 5/2005 | Roberts |
| 2004/0067136 A1* | 4/2004 | Roberts .................... 416/211 |
| 2007/0098555 A1 | 5/2007 | Siegfriedsen |

* cited by examiner

*Primary Examiner* — Michael Lebentritt
*Assistant Examiner* — Aaron Dehne
(74) *Attorney, Agent, or Firm* — Arthur Freilich

(57) ABSTRACT

A rotor assembly for a wind turbine including at least one blade adapted to automatically adjust its shape as a function of rotational speed to create an efficient fluid dynamic profile over a wide range of wind conditions and rotational speeds. The rotor assembly includes at least one blade configured to respond to rotation induced forces to automatically bend in a manner to optimize its wind profile.

11 Claims, 6 Drawing Sheets

WIND TURBINE ROTOR ASSEMBLY

RELATED APPLICATIONS

This application claims priority based on U.S. provisional application 61/005,595 filed on 5 Dec. 2007.

FIELD OF THE INVENTION

The invention described herein relates generally to wind turbines and more particularly to a rotor assembly particularly suited for use in a wind turbine system.

BACKGROUND OF THE INVENTION

A wind turbine is a machine for converting the kinetic energy of an air flow into mechanical energy. The mechanical energy is most frequently used to drive an electric generator but can alternatively be used to drive a variety of other loads such as a pump, a grinding stone, etc.

The prior art is replete with various wind turbine designs. They typically include a rotor assembly including two or more blades, a shaft for transferring rotational energy from the rotor assembly to an electric generator, and a housing generally including a gear box, the electric generator, and an electronic controller. The rotor assembly and housing are typically mounted on a tower to provide sufficient elevation to best expose the blades to the local wind and to assure proper ground clearance. A yaw controller is generally provided to optimally align the rotor assembly relative to the wind direction.

SUMMARY OF THE INVENTION

The present invention is directed to a rotor assembly including at least one blade adapted to automatically adjust its shape as a function of rotational speed to create an efficient fluid dynamic profile over a wide range of wind conditions and rotational speeds. More particularly, a rotor assembly in accordance with the invention includes at least one blade configured to respond to rotation induced forces to automatically bend in a manner to optimize its wind profile.

A blade in accordance with the invention is characterized by at least one substantially noncompliant region and at least one substantially compliant region. The blade is mounted with its noncompliant region positioned close to a rotor shaft primary axis and its compliant region positioned radially outward from the noncompliant region and displaced axially therefrom. As a consequence, rotation induced forces act to bend the blade in the compliant region to reduce the axial displacement. The blade is preferably constructed so that the bending occurs along predefined channels to adjust the shape of the blade to create a profile appropriate to the speed of rotation.

A preferred rotor assembly in accordance with the invention includes a rotor shaft member carrying a hub structure defining a hub plane oriented substantially perpendicular to the shaft primary axis. The hub structure supports two or more blades which are preferably distributed uniformly around the primary axis. Each blade includes a proximal region which is mounted proximate to the hub structure and a distal region which is spaced radially outward from the proximal region. Moreover, each blade is mounted at an angle relative to the primary axis so as to axially space the proximal and distal regions when the blade is at rest. Moreover, each blade is mounted so as to define a pitch angle appropriate to divert an axial wind component in a direction to rotate the blade around said primary axis.

Each blade is constructed so that its proximal region is relatively stiff, or noncompliant, and its distal region is relatively flexible, or compliant. This enables the distal region to automatically bend as the blade rotates to create and maintain an efficient blade profile over a wide range of wind conditions and rotational speeds.

A blade embodiment in accordance with the invention includes a noncompliant region adjacent the blade proximal end and one or more regions of progressively greater compliance, or lesser stiffness, approaching a compliant region at the blade distal end. The compliant region extends laterally and longitudinally beyond an outer edge of the noncompliant region. The transitions between regions form bend channels around which the blade will bend as it rotates. The outer transition preferably defines lateral and longitudinal portions to facilitate compound bending by the compliant region.

More particularly, a blade embodiment in accordance with the invention comprises a substantially planar, i.e., sheetlike, member having a proximal region, or inner end, and a distal region, or outer end. The blade defines a periphery which includes a first, or leading, edge and a second, or trailing edge. The leading edge of the preferred blade embodiment includes a portion extending substantially longitudinally and a portion extending substantially laterally. The trailing edge similarly includes a substantially longitudinal portion and a substantially lateral portion. The blade is mounted on the hub structure with an appropriate pitch angle so that an axially directed wind will produce a force component to rotate the blade in a direction so that the air is cut first by the leading edge. As a consequence of the rotation and radial acceleration, the blade distal end will move radially outward and axially toward the hub plane, i.e., in a direction opposite to the incoming wind. This action automatically shapes the blade's compliant region, e.g., draft, tension, and pitch, to define a profile which efficiently converts the wind energy to rotational mechanical energy over a wide range of wind conditions and rotational speeds.

The preferred rotor assembly described herein includes at least one substantially planar, i.e., sheetlike, blade having a proximal region which is substantially rigid, a slightly compliant intermediate region radially outward from the proximal region, and a moderately compliant distal region radially outward of the intermediate region. The proximal region defines a substantially circumferential outer edge which serves as a bend channel for the intermediate and distal regions. The intermediate region defines a substantially circumferential outer edge which serves as a bend channel for the distal region.

BRIEF DESCRIPTION OF THE FIGURES

FIG. 1a. is a side elevational view of an exemplary two blade rotor assembly in accordance with the invention and FIG. 1b. is an enlarged edge view taken substantially along the plane 1b-1b of FIG. 1a.;

DETAILED DESCRIPTION

Figures 1A, 1B:
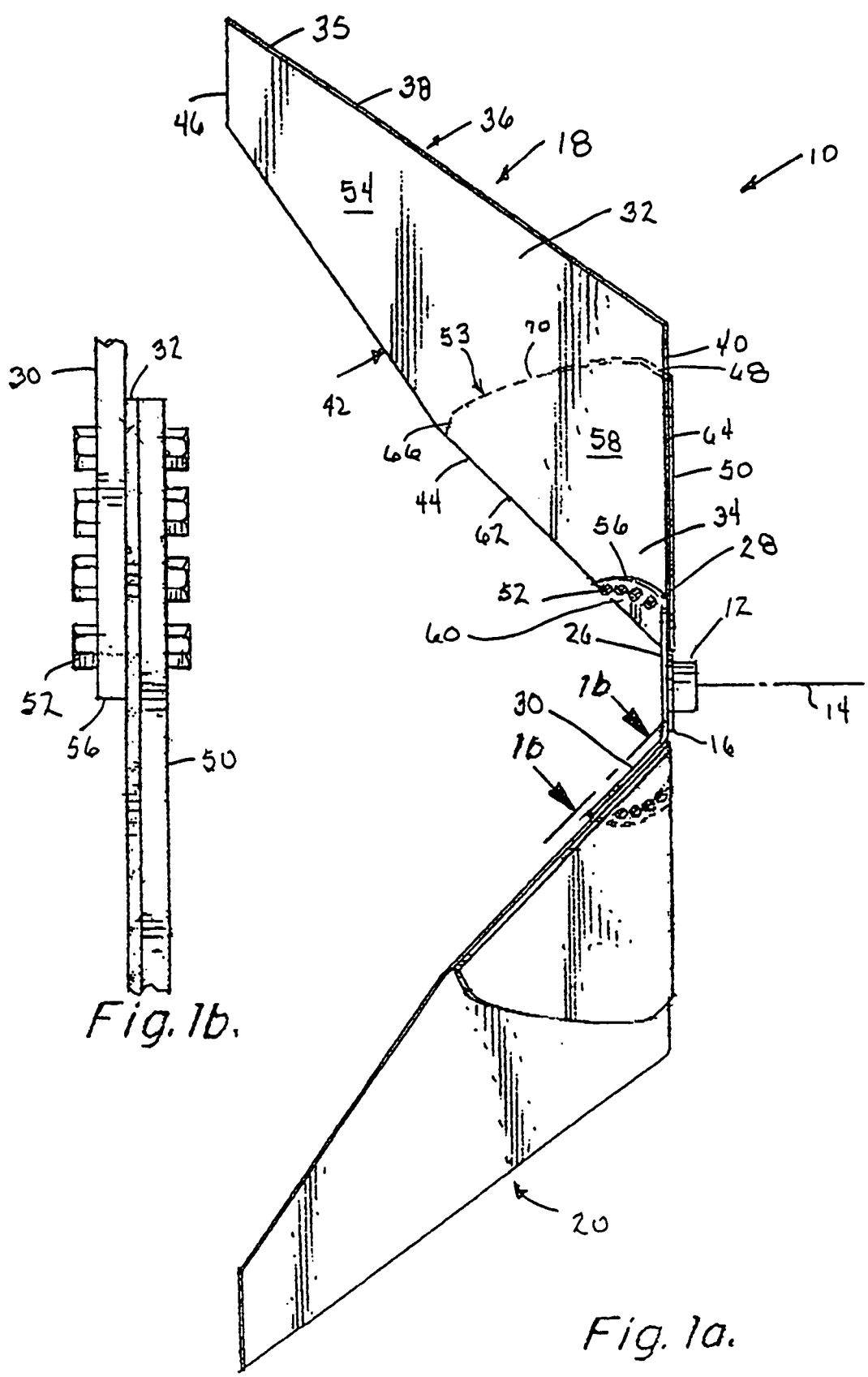
Figure 2:
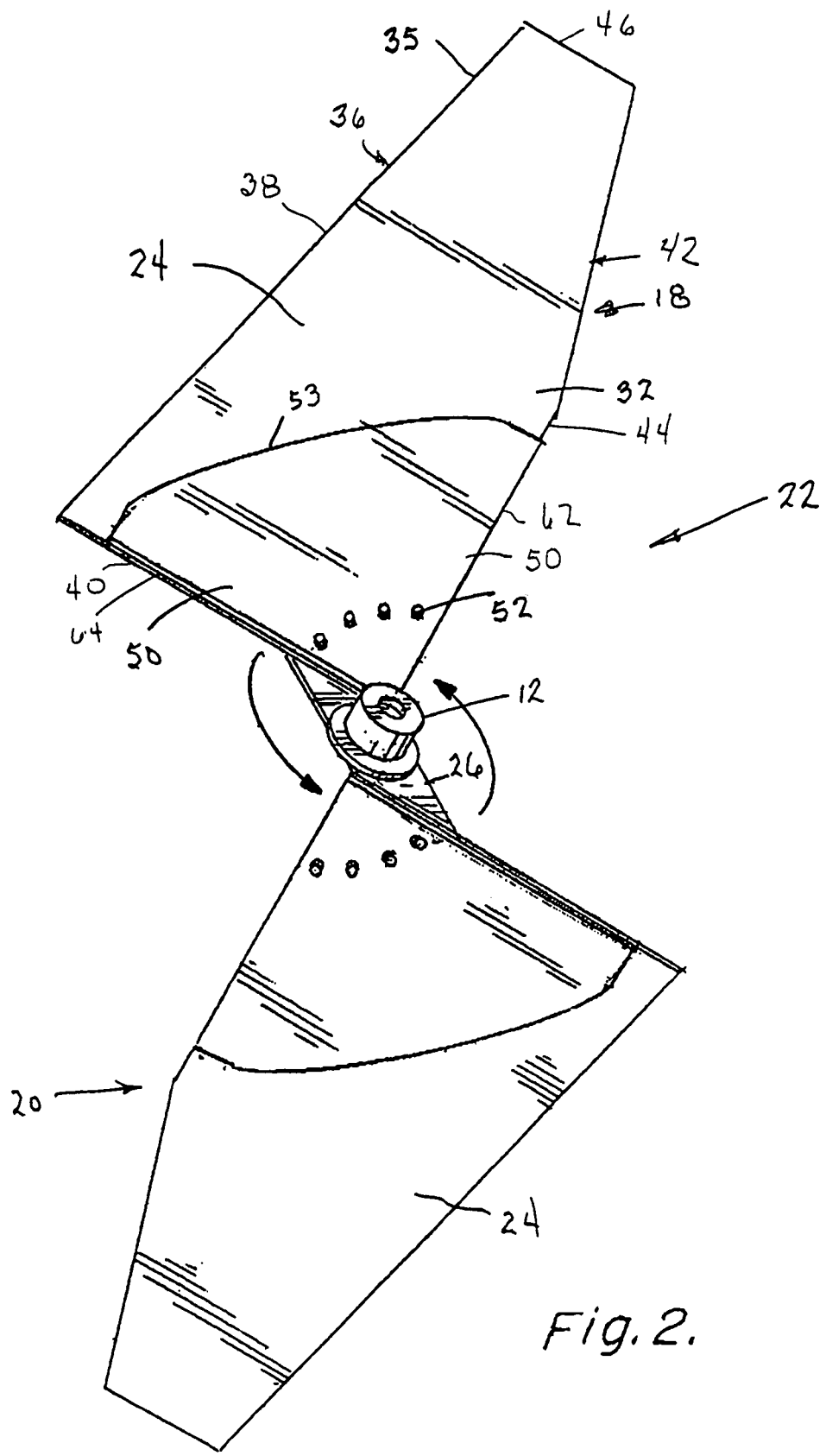
FIG. 2 is a front elevation view of the rotor assembly of FIG. 2.
Figure 3:
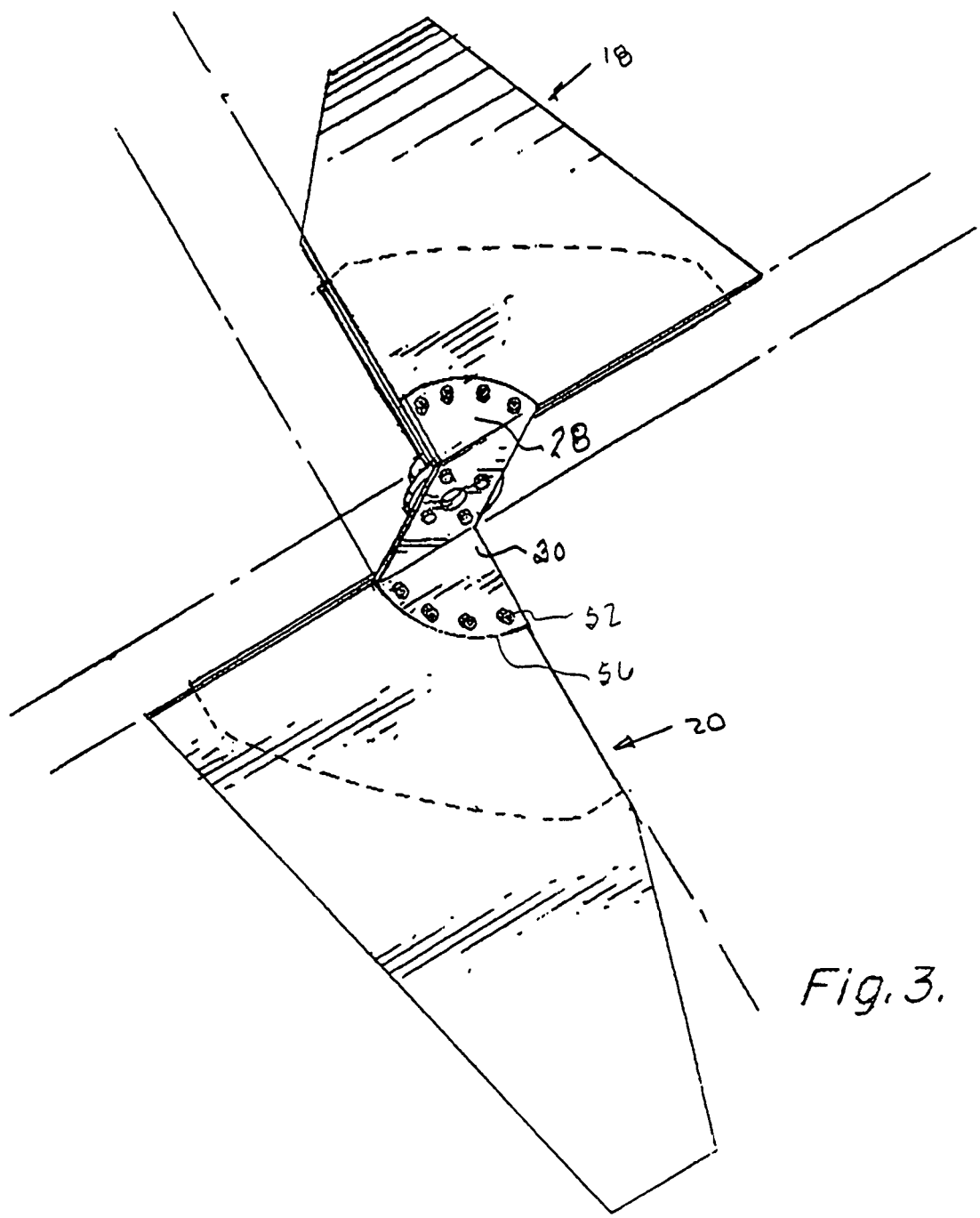
FIG. 3 is a rear elevation view of the rotor assembly of FIG. 1.

Attention is now directed to FIGS. 1-3 which illustrate a preferred exemplary embodiment of a rotor assembly 10 in accordance with the present invention. The assembly 10 includes a shaft member 12, e.g., a collar, intended to be mounted for rotation around a primary shaft axis 14. The shaft member 12 preferably carries a hub structure 16 configured to mount one or more rotor blades 18, 20. As will be discussed in greater detail hereinafter, the blades are mounted to define a pitch which causes them to rotate counter clockwise, as seen in FIG. 2, in response to a wind component 22 directed against the front faces 24 of the blades 18, 20. The hub structure 16 includes a rigid plate 26 defining a hub plane oriented substantially perpendicular to the primary axis 14 of shaft member 12. The plate 26 is formed to define terminal mounting ears 28, 30, each located radially outward from axis 14 and oriented at an angle, e.g., 30°-35°, relative to the hub plane defined by plate 26.

Inasmuch as the rotor blades 18, 20 are preferably identically constructed, the detailed discussion herein will primarily refer to blade 18 but, unless otherwise stated, should be understood as also applying to blade 20. The blade 18 includes a flexible substantially planar, or sheetlike, member 32 which may be considered as having an elongate somewhat trapezoidal shape having a radially inward proximal region 34 and a radially outward distal region 35. The planar member 32 defines a periphery including (1) a leading edge 36 having a substantially longitudinally oriented portion 38 and a substantially laterally oriented portion 40 and (2) a trailing edge 42 having a substantially longitudinally oriented portion 44 and a substantially laterally oriented portion 46.

A relatively stiff substantially planar member 50 overlays a portion of the proximal region 34 of the flexible planar member 32. The stiff planar member 50 is preferably affixed to rigid mounting ear 28 by fasteners 52, e.g., rivets or bolts, installed adjacent to the outer edge so as to sandwich the flexible member 32 therebetween, as best seen in FIG. 1b. Note that a portion of flexible member 32 extends outwardly of the edge 53 of stiff member 50 to define a moderately compliant blade area 54 near the distal region 35. Note also that a portion of stiff member 50 extends outwardly of the edge 56 of rigid mounting ear 28 to define a slightly compliant area 58 near the proximal region 34 which is less compliant than the area 54. The rigid mounting ear 28 defines a substantially noncompliant region 60. More particularly, note that the perimeter of the stiff member 50 is comprised of the outer edge 53, a substantially longitudinally oriented edge 62 which is preferably aligned with the trailing edge 42 longitudinally oriented portion 44 and a substantially laterally oriented edge 64 which is preferably aligned with the leading edge 36 laterally oriented portion 40. Also note that the outer edge 53 includes a substantially laterally oriented edge portion 66, a substantially longitudinally oriented edge portion 68, and a connecting diagonal edge portion 70.

Note that the trailing edge portion 42 extends beyond the outer edge 53 of stiff member 50, and that the stiff member 50 edges 62, 64 each extend beyond outer edge 56 of the rigid mounting ear 28. As will be discussed hereinafter, the stiff member outer edge 53 (including 68 & 66) substantially defines a fulcrum, around which the compliant blade area 54 can bend, both longitudinally and laterally, in response to rotation induced forces, to form a first bend channel. Fasteners 52 installed adjacent to ear outer edge 56 also substantially define a fulcrum around which compliant regions 54 and 58 can bend to form a second bend channel.

When at rest, the nominal plane of blade 18 will extend at an angle or pitch of approximately 30°-35° relative to the hub plane, i.e., 60°-55° relative to the primary axis 14. This orientation will place the blade distal region 35 radially and axially remote from the proximal region 34 adjacent to mounting ear 28.

Figure 4:
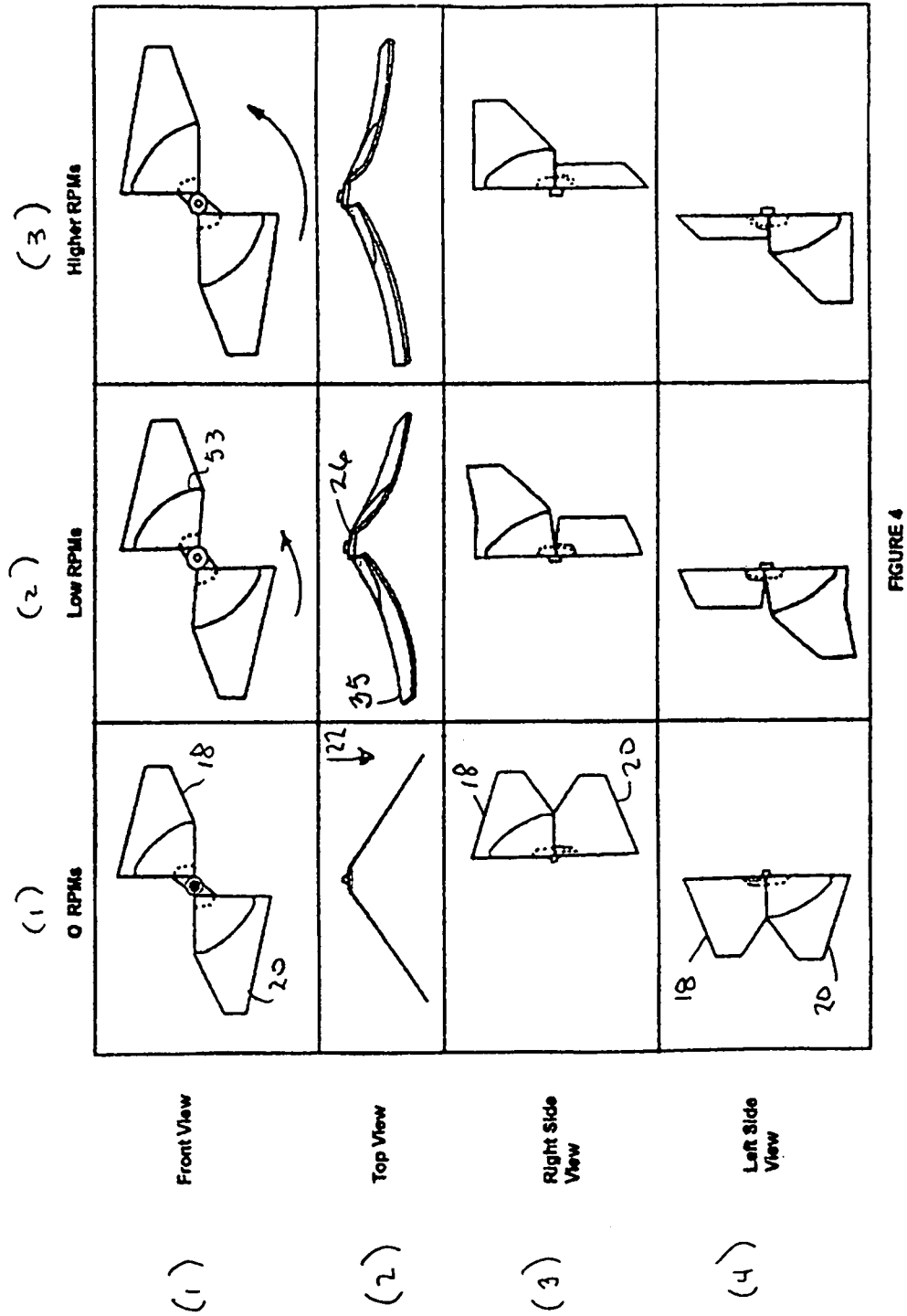
FIG. 4 is a matrix of schematic representations respectively depicting the assembly of FIG. 1 at 0, (column 1), low (column 2), and high (column 3) rotational speeds.

Attention is now directed to FIG. 4 which comprises a matrix of schematic representations depicting different views of the rotor assembly 10 at different rotational speeds. More particularly, rows 1 through 4 of FIG. 4 respectively show front, top, right side, and left side views whereas columns 1 through 3 respectively show the assembly 10 at rest, at low speed, and at high speed.

Initially note that row 1, column 1, shows a front view of assembly 10 similar to the showing in FIG. 2. Note that row 2, column 1 is a top view showing that the blades 18, 20 are oriented at 30°-35° relative to the hub plane. Now contrast row 2, column 2 with row 2, column 1 which demonstrates that as the blades transition from rest to a low rotational speed, the blade distal regions 35 move in a direction toward the hub plane 26 and opposite to the wind direction 22. This action causes the compliant region 54 to bend along stiff member outer edge 53 and slightly compliant region 58 to bend around non compliant region outer edge 56. This action modifies the blade's shape causing its longitudinal leading edge 38 to lift more on average than the longitudinal trailing edge 44 thus increasing its lateral pitch and draft and decreasing its longitudinal pitch and draft resulting in a wind profile which is optimized for the rotational speed. As the speed increases further to column 3, the blade distal regions 35 move even further axially toward the hub plane 26 decreasing the bending around edge 53 and increasing the bending around edge 56. This action further modifies the blade's profile to decrease both longitudinal and lateral pitches, flatten the draft, and move the draft location closer to the lateral leading edge, to optimize it for the increased rotational speed.

From the foregoing, it should now be appreciated that a rotor assembly has been disclosed herein utilizing a blade configured to automatically bend as a function of rotational speed to present an optimum wind profile over a wide range of conditions. The blade is characterized by a stiffness which diminishes progressively from the proximal blade end to the distal blade end. Stated otherwise, the blade is characterized by a compliance which increases from the proximal to the distal end. Although the preferred blade described herein achieves this progressive compliance characteristic by using multiple overlapping members, e.g., ear 28 and stiff member 50, it is recognized that the blade can be alternatively formed, for example, by using a single planar member whose thickness, and thus stiffness, is reduced from the blade's proximal end to its distal end. Alternatively, stiffening rods or cables can be selectively used to achieve the desired progressive compliance.

Embodiments of the present invention can be fabricated in a variety of manners utilizing a wide range of materials and dimensions. The specifications of one exemplary two blade embodiment are summarized in Table A hereinafter.

TABLE A

2 Blade Rotor, 35 Degree Pitch, 44" Outer Diameter Unflexed, 50" O.D. Fully Flexed

| Item | Material | Dimension |
|---|---|---|
| shaft member 12 | Steel | 1.75" O.D. × .625 I.D. × .900" Long, 1.125" O.D. × .625 I.D. × .125" long (with a stiffening disk 3"O.D. × 1.125" I.D. by .125" thick) ⅝-18 threaded I.D. |
| hub structure 16 | Steel | |
| rigid plate 26 | Steel (Type 4130) | .125" thick plate, 4" × 5" parallelogram, with two ears (4" × 3" × 4"radius) bent down 35 degrees. |
| noncompliant region 60 | Various | .125" thick steel, .091" thick HDPE, .040" aluminum = .256" total thickness |
| outer edge, rigid ear 56 | Steel (Type 4130) | 5.75" length (approx. radius 4"), .125" thick |
| terminal mounting ear 28, 30 | Steel (Type 4130) | 4.0" lateral edge × 3.0" longitudinal edge × 4" radius × .125" thick |
| flexible sheet member 32 | High Density Polyethylene (HDPE) | polygon 14" × 22.78" × 4.20" × 12.27" × 11.00" × .090" thick (22.25" between lateral leading edge and lateral trailing edge). |
| leading edge 36 | | 36.78" |
| longitudinally oriented portion 38 | | 22.78" |
| laterally oriented portion 40 | | 14.00" |
| trailing edge 42 | | 27.47" |
| longitudinally oriented portion 44 | | 23.27" |
| laterally oriented portion 46 | | 4.20" |
| fasteners/screws, bolts, or rivets 52 | Steel | 10-24 × ½ long, .190" from outer edge, spaced approx. equidistant from each other. |
| compliant blade region 54 | High Density Polyethylene (HDPE) | .091" thick |
| slightly compliant region 58 | Various | .091 thick HDPE + .040 thick 7075 Aluminum = .131" total thickness |
| stiff planar member 50 | Aluminum (Type 7075) | 10.75" × 1.75" × 13" (approx. 14" radius) × 1.75" × 10.25" × .040" thick |
| stiff member outer edge, longitudinal portion 62 aligned with trailing edge portion 42 | | 10.75" |
| stiff member outer edge, lateral portion 64 aligned with leading edge, portion 40 | | 10.75" |
| outer edge, stiff member 53 | Aluminum (Type 7075) | 1.75" × 13" (approx. 14" radius) × 1.75" × .040" thick |
| stiff member outer edge, lateral portion 66 | | 1.75" |
| stiff member outer edge, longitudinal portion 68 | | 1.75" |
| stiff member outer edge, arc portion 70 | | 13" length (approx. 14.00" Radius) |

Figure 5:
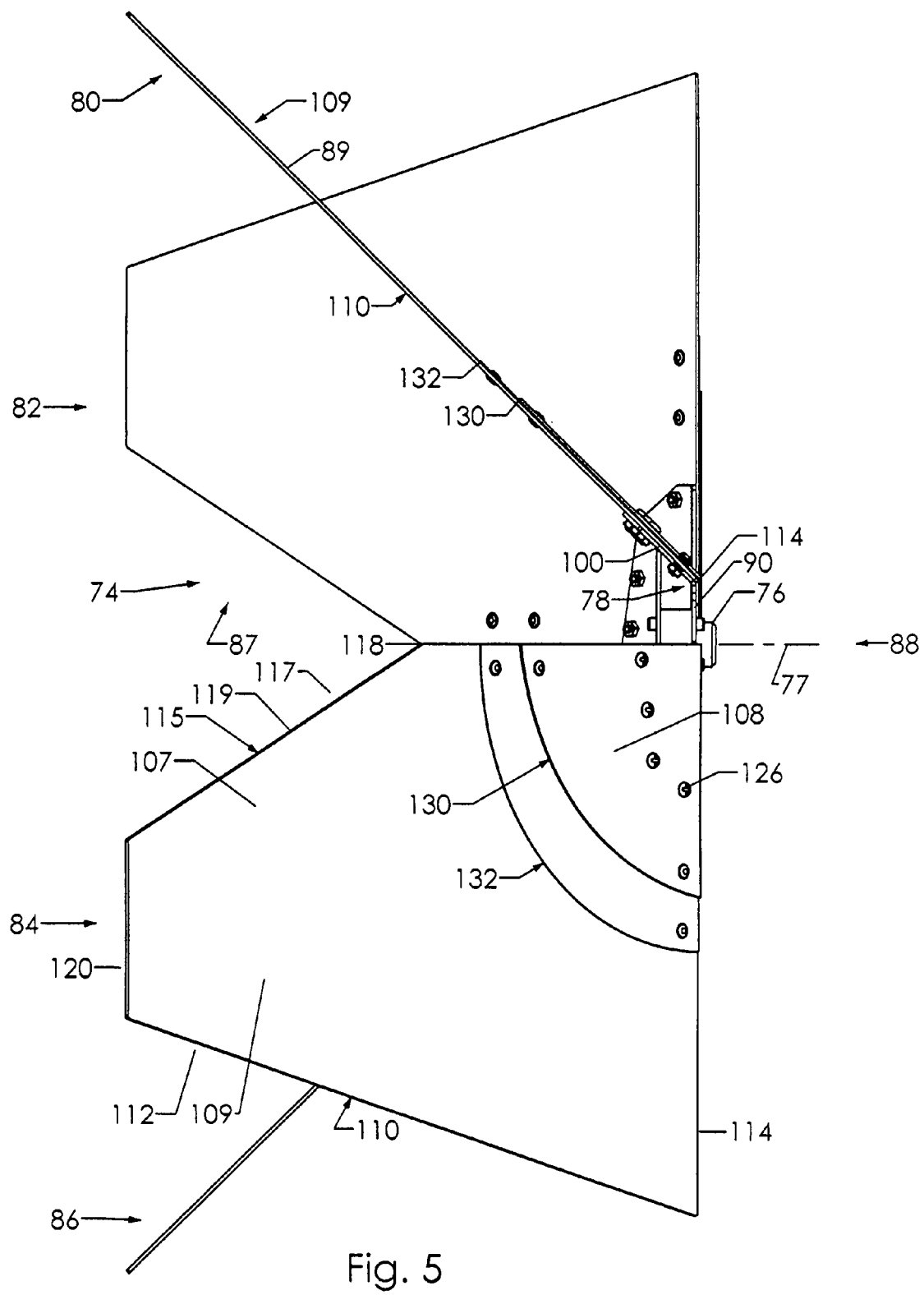
FIG. 5 is a side elevational view of an exemplary four blade rotor assembly in accordance with the invention oriented with the primary shaft axis substantially coincident with the plane of the paper.
Figure 7:
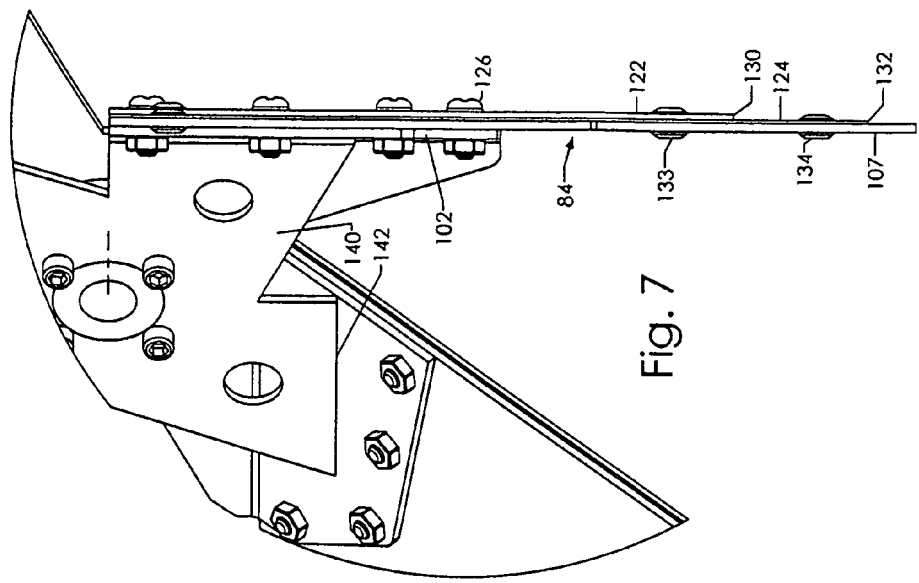
FIG. 7 is an enlarged plan view of a portion of FIG. 6 showing how the proximal end of a blade is mounted to the hub structure.
Figure 6:
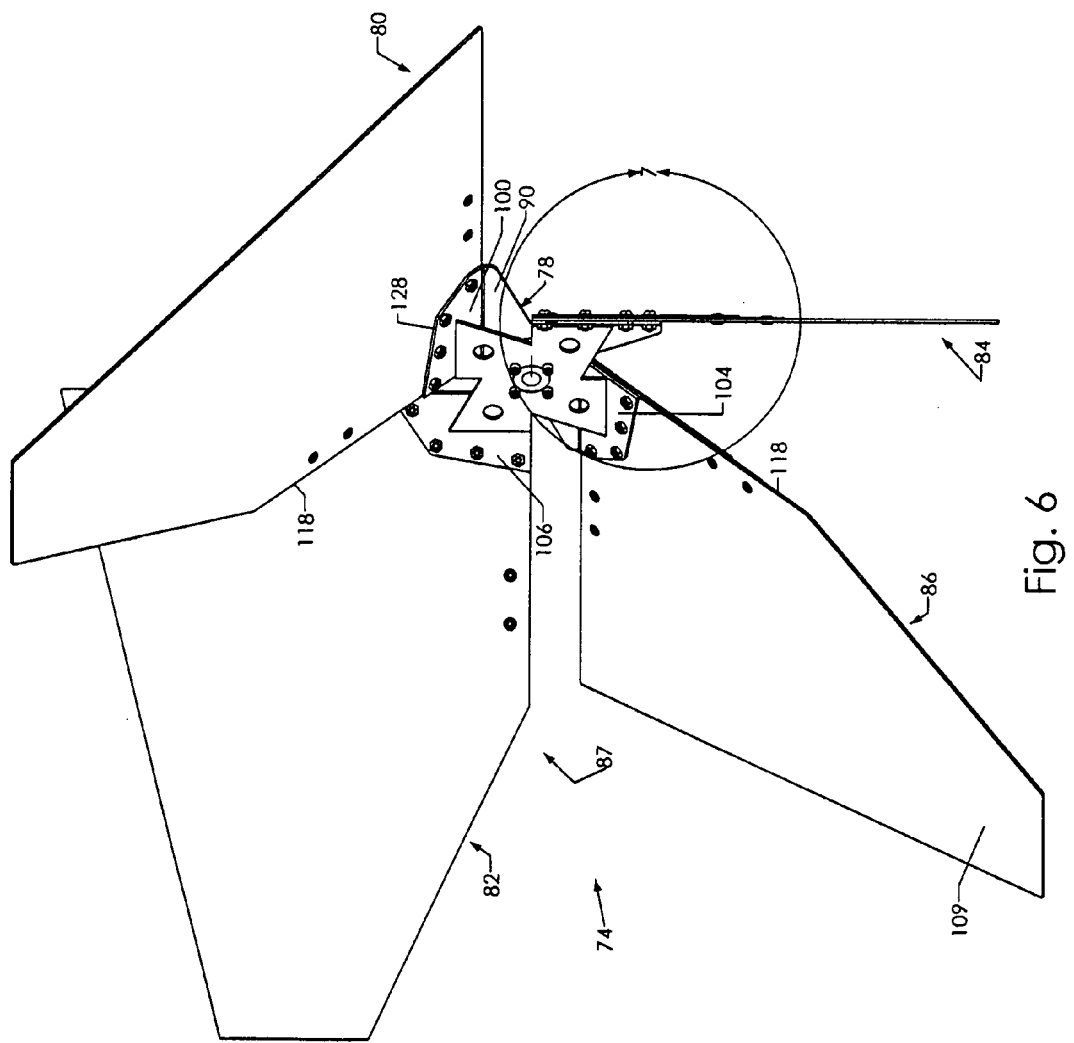
FIG. 6 shows the four blade embodiment of FIG. 5 oriented to show the primary shaft axis extending at about 45° relative to the plane of the paper.

Attention is now directed to FIGS. 5-7 which illustrate an exemplary four blade rotor assembly 74 in accordance with the present invention. The embodiment 74 can be constructed similarly to the two blade embodiment 10 previously discussed with reference to FIGS. 1a, 1b, and 2-4.

The rotor assembly 74 includes a shaft member 76, e.g., a collar, intended to be mounted for rotation around a primary shaft axis 77. The shaft member 76 preferably carries a hub structure 78 configured to mount rotor blades 80, 82, 84, 86. As with the aforediscussed two blade embodiment, the blades are mounted to define a pitch which causes them to rotate counter clockwise, represented by direction arrow 87 in response to a wind component 88 directed against the front faces 89 of the blades 80, 82, 84, 86. The hub structure 78 includes a rigid plate 90 defining a hub plane oriented substantially perpendicular to the primary axis 77 of shaft member 76. The plate 90 is preferably formed to define rigid mounting ears 100, 102, 104, 106 each located radially outward from axis 77 and oriented at an angle, e.g., 45°, relative to the hub plane defined by plate 90.

Inasmuch as the rotor blades 80, 82, 84, 86 are preferably identically constructed, the detailed discussion herein will primarily refer to blades 80 and/or 84 but, unless otherwise stated should be understood as also applying to blades 82 and 86. Each blade includes a compliant substantially flexible planar, or sheetlike, member 107 which may be considered as having an elongate polygonal, or somewhat trapezoidal, shape having a radially inward proximal region 108 and radially outward distal region 109. The planar member 107 defines a periphery including (1) a leading edge 110 having a substantially longitudinally oriented portion 112 and a substantially laterally oriented portion 114 and (2) a trailing edge 115 having a substantially longitudinally oriented portion 117 (including segments 118 and 119) and a substantially laterally oriented portion 120.

With particular reference to FIG. 7, note that in addition to the compliant member 107, blade 84 is comprised of two additional planar layers, i.e., a relatively stiff inner member 122 and a more compliant intermediate member 124. The stiff inner member 122, intermediate member 124, and compliant member 107 are sandwiched together and mounted to the noncompliant rigid ear 102 by fasteners 126, e.g., screws or rivets. Note in FIG. 7 that the ear 102, the inner member 122, and the intermediate member 124 respectively define outer edges 130 and 132. Also note that fasteners 133 secure planar members 107, 122, and 124 to each other and that fasteners 134 secure members 107 and 124. The materials and dimensions of the ear 102 inner member 122 intermediate member 124, and compliant member 107 are selected to exhibit diminishing stiffness progressing toward the outer distal end of the blade.

FIGS. 5-7 also show a central brace 140 which is preferably welded at 142 against the hub structure ears 100, 102, 104, 106 to enhance rigidity, particularly for use in large diameter rotor assemblies.

As with the aforedescribed two blade embodiment of FIGS. 1a, 1b, and 2-4, the embodiment 74 of FIGS. 5-7 will specifications of one exemplary four blade embodiment are summarized in Table B hereinafter.

TABLE B

4 Blade Rotor, 45 Degree Pitch, 37" Outer Diameter Unflexed, 46" Outer Diameter Fully Flexed - Materials and Dimensions

| Item | Material | Dimension |
|---|---|---|
| rotor assembly 74 | | |
| shaft member 76 | steel | 1.75" O.D. × .800" L, 1.25" O.D. × .6" L, & .1" L, 17 MM I.D. × 1.5" length (.100" step and .600 step O.D. 1.25") fastened to plate 90 & brace 140 with screws. |
| shaft axis 77 | | |
| hub structure 78 | | |
| Blade 80 | Various | polygon 14.375" × 20.72" × 4.5" × 11.44" × 9.75" × .091" to .285" thick, 20.125" overall length. |
| Blade 82 | Various | polygon 14.375" × 20.72" × 4.5" × 11.44" × 9.75" × .091" to .285" thick, 20.125" overall length. |
| Blade 84 | Various | polygon 14.375" × 20.72" × 4.5" × 11.44" × 9.75" × .091" to .285" thick, 20.125" overall length. |
| Blade 86 | Various | polygon 14.375" × 20.72" × 4.5" × 11.44" × 9.75" × .091" to .285" thick, 20.125" overall length. |
| rotational direction 87 | | |
| wind component (direction) 88 | | |
| face of blades 89 | | |
| rigid plate 90 | steel (type 4130) | .100 thick plate perpendicular to shaft axis 77, approximately 8.9" diameter with 4 mounting ears (approx. 2.5" × 4" with arc 5.38" long), within that dia., bent down 45 degrees, spaced 90 degrees apart. |
| terminal mounting ear 100, 102, 104, 106 | steel (type 4130) | 4" × 2.5" × 3.1" × 1.67" × .6" |
| flexible sheet member 107 | high density polyethylene | polygon 14.375" × 20.72" × 4.5" × 11.44" × 9.75" × .091" thick, 20.125" overall length. |
| inward proximal region 108 | | |
| outward distal region 109 | | |
| leading edge 110 | | 35.125" |
| leading edge longitudinally oriented portion 112 | | 20.75" |
| leading edge laterally oriented portion 114 | | 14.375" |
| trailing edge 115 | | 25.75" |
| trailing edge longitudinally oriented portion 117 | | 21.25" |
| including longitudinal segments 118 and 119 | | 9.75" and 11.436" |
| trailing edge laterally oriented portion 120 | | 4.5" |
| inner relatively stiff planar member 122 | FR-4 G10 epoxy sheet | .063" thick G10 epoxy sheet, 6.38" × 6.38" × 7.72" radius |
| intermediate relatively stiff planar member 124 | FR-4 G10 epoxy sheet | .031" thick G10 epoxy sheet, 7.5" × 7.5" × 7.5" radius |
| fasteners/machine screws 126 | stainless steel | 10-24 × .5 L, for securing members 107, 122, and 124 to each mounting ear 100-106, 4 ea. per blade. |
| outer edge, rigid ear 128 | steel (type 4130) | 3.11" at 80.2 degrees, 1.67" at 134 degrees, .6" at 145.77 degrees with fastener 126 adjacent edge |
| inner relatively stiff member, outer edge 130 | | 7.72" radius |
| outer relatively stiff member, Outer edge 132 | | 7.75" radius |
| fasteners/rivets 133 & 134 | aluminum | tubular truss rivets for securing members 107, 122, and 124 together 4 ea. per blade |
| brace plate 140 | steel (type 4130) | flat plate approximately 5" × 5" × .10" thick, perpendicular to shaft member with 2.5" edges welded to interior of terminal mounting ears 100, 102, 104, 106 |
| welded edges 142 | | 4 ea. 2.5" edges of member 140 welded to mounting ears 100, 102, 104, 106 | rotate in response to a wind component 88 striking the front faces 89 of blades 80, 82, 84, 86. Transitions between regions of different stiffness in each blade define bend channels that follow substantially helical patterns relative to shaft axis 77. The stiffness of these regions progressively diminish with radial distance from the shaft axis 77. As the speed of rotation increases, each blade progressively bends around bend channels respectively defined by edge 132, edge 130, and fasteners 126, each of which acts as a fulcrum to allow the blades distal end to move radially outward and toward the hub plane defined by rigid plate 90. As the speed of rotation increases, the blade bending along the helical bend channels results in the blade forming a helicoid like structure, with a diminishing helical pitch and an expanding rotational diameter around shaft axis 77, thus reshaping the profile to optimize it for the current rotational speed.

As previously noted, embodiments of the invention can be provided in a wide range of materials and dimensions. The

The invention claimed is:

1. A rotor assembly configured to be rotated by a fluid moving therepast, said assembly comprising:
    a shaft member defining a primary axis mounted for rotation around said axis;
    at least one blade having longitudinally spaced proximal and distal ends;
    said blade proximal end being mounted to said shaft member with said blade extending therefrom at an angle causing said distal end to be radially and axially spaced from said proximal end;
    said blade being comprised of multiple regions including a first region located proximate to said proximal end, at least one second region located radially outwardly from said first region, and a third region located between said second region and said distal end;
    said first, second, and third regions respectively characterized by progressively diminishing stiffness; and wherein said blade defines a first bend channel at the transition between said first and second regions and a second bend channel at the transition between said second and third regions.

2. The rotor assembly of claim 1 wherein at least one of said bend channels follows a substantially helical pattern relative to said shaft axis.

3. The rotor assembly of claim 1 wherein said blade has a front face and a rear face; and wherein
said blade defines a pitch oriented to rotate said blade in a first direction by an air flow directed toward said front face.

4. The rotor assembly of claim 1 wherein said blade defines a perimeter including (1) a leading edge having a substantially longitudinally oriented portion and a substantially laterally oriented portion and (2) a trailing edge having a substantially longitudinally oriented portion and a substantially laterally oriented portion; and wherein
said first region extends along said leading edge laterally oriented portion and said trailing edge longitudinally oriented portion.

5. The rotor assembly of claim 1 wherein said blade defines a perimeter including (1) a leading edge having a substantially longitudinally oriented portion and a substantially laterally oriented portion and (2) a trailing edge having a substantially longitudinally oriented portion and a substantially laterally oriented portion; and wherein
said second bend channel includes lateral and longitudinal portions.

6. The rotor assembly of claim 1 wherein said blade's lateral pitch initially increases upon rotation and then decreases with increasing rotational speed.

7. A wind turbine comprising:
a shaft member mounted for rotation around a primary axis;
at least one substantially planar blade having longitudinally spaced proximal and distal ends, said blade defining a periphery including (1) a leading edge having a substantially longitudinally oriented portion and a substantially laterally oriented portion and (2) a trailing edge having a substantially longitudinally oriented portion and a substantially laterally oriented portion;
a hub structure mounting said blade to said shaft member, said hub structure orienting said blade to place said proximal end proximate to said shaft member and said distal end spaced radially and axially from said proximal end; and wherein
said blade is comprised of multiple regions including a proximal region located proximate to said proximal end, at least one intermediate region located radially outwardly from said proximal region, and a distal region located between said intermediate region and said distal end;
said proximal, intermediate, and distal regions respectively characterized by progressively diminishing stiffness; and wherein
said blade defines a first bend channel at the transition between said proximal and intermediate regions and a second bend channel at the transition between said intermediate and distal regions;
said blade having a front face and a rear face and a pitch oriented to rotate said blade in response to air flow directed toward said front face; and wherein
said distal end is mounted to move axially closer to said proximal end in response to said rotation by causing said blade to bend around said bend channels.

8. The wind turbine of claim 7 wherein at least one of said bend channels follows a substantially helical pattern relative to said shaft axis.

9. The wind turbine of claim 7 wherein said proximal region extends along said leading edge laterally oriented portion and said trailing edge longitudinally oriented portion.

10. The wind turbine of claim 7 wherein said second bend channel includes lateral and longitudinal portions.

11. The wind turbine of claim 7 wherein said blade's lateral pitch initially increases upon rotation and then decreases with increasing rotational speed.

* * * * *